Aug. 31, 1965  W. L. SHEPPARD  3,203,186
FORCE TRANSMITTING SYSTEM
Filed Aug. 25, 1960  3 Sheets-Sheet 1

INVENTOR.
William L. Sheppard
BY
Harness, Dickey & Pierce
ATTORNEYS

Aug. 31, 1965  W. L. SHEPPARD  3,203,186
FORCE TRANSMITTING SYSTEM
Filed Aug. 25, 1960  3 Sheets-Sheet 2
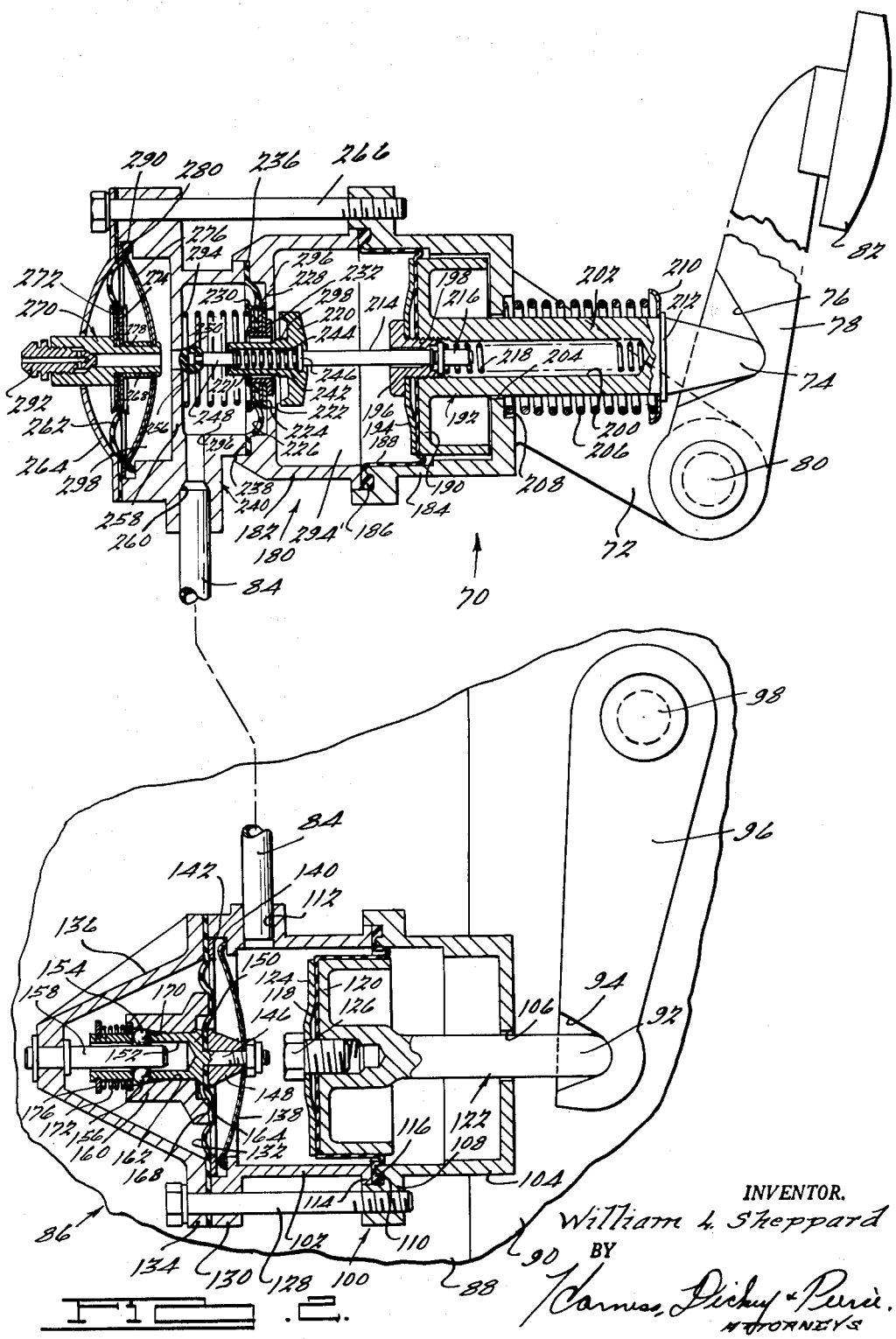
INVENTOR.
William L. Sheppard
BY
Carnes, Dickey & Pierce.
ATTORNEYS

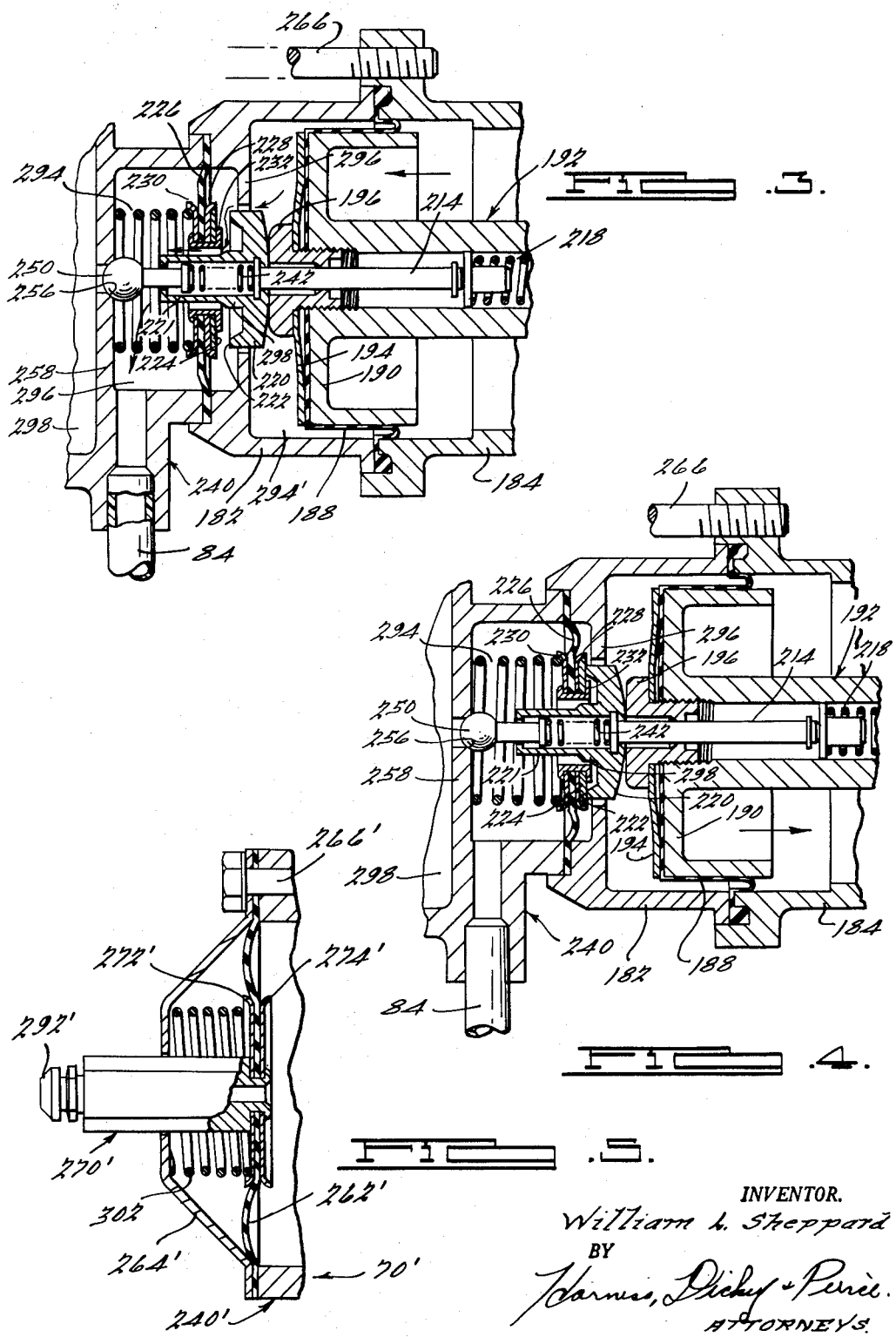

United States Patent Office 3,203,186
Patented Aug. 31, 1965

3,203,186
FORCE TRANSMITTING SYSTEM
William L. Sheppard, Romulus, Mich., assignor of one-half to Edwin J. Lukas, Dearborn, Mich.
Filed Aug. 25, 1960, Ser. No. 51,912
38 Claims. (Cl. 60—54.5)

This invention relates to fluid systems and apparatus usable therein.

An object of this invention is to improve sealed hydrostatic force transmitting systems.

Another object of this invention is to improve and simplify the association of a movable piston with a rolling lobe diaphragm.

Another object of this invention is to reduce the effect upon seal hydrostatic force transmitting systems and the like of changes in the ambient temperature.

A further object of this invention is to establish a different input force requirement to actuate a loaded sealed hydrostatic force transmitting system than to maintain the system in an actuated position.

The manner of accomplishing the foregoing objects and other objects and features of the invention will become apparent from the following detailed description of embodiments of the invention when read with reference to the accompanying drawings in which:

FIG. 2 is a representation of a sealed hydrostatic force transmitting system in partial section, embodying certain of the principles of the present invention and representatively utilized as an element of a vehicular clutch system;

FIG. 3 is a fragmentary sectional view of a portion of the apparatus of FIG. 2 in another stage of its operation;

FIG. 4 is a fragmentary sectional view of the apparatus of FIG. 3 shown in a different stage of its operation; and FIG. 5 is a fragmentary sectional view of a different form of ambient temperature variation compensator suitable for use in lieu of the compensator shown in FIG. 2.

Figure 1:
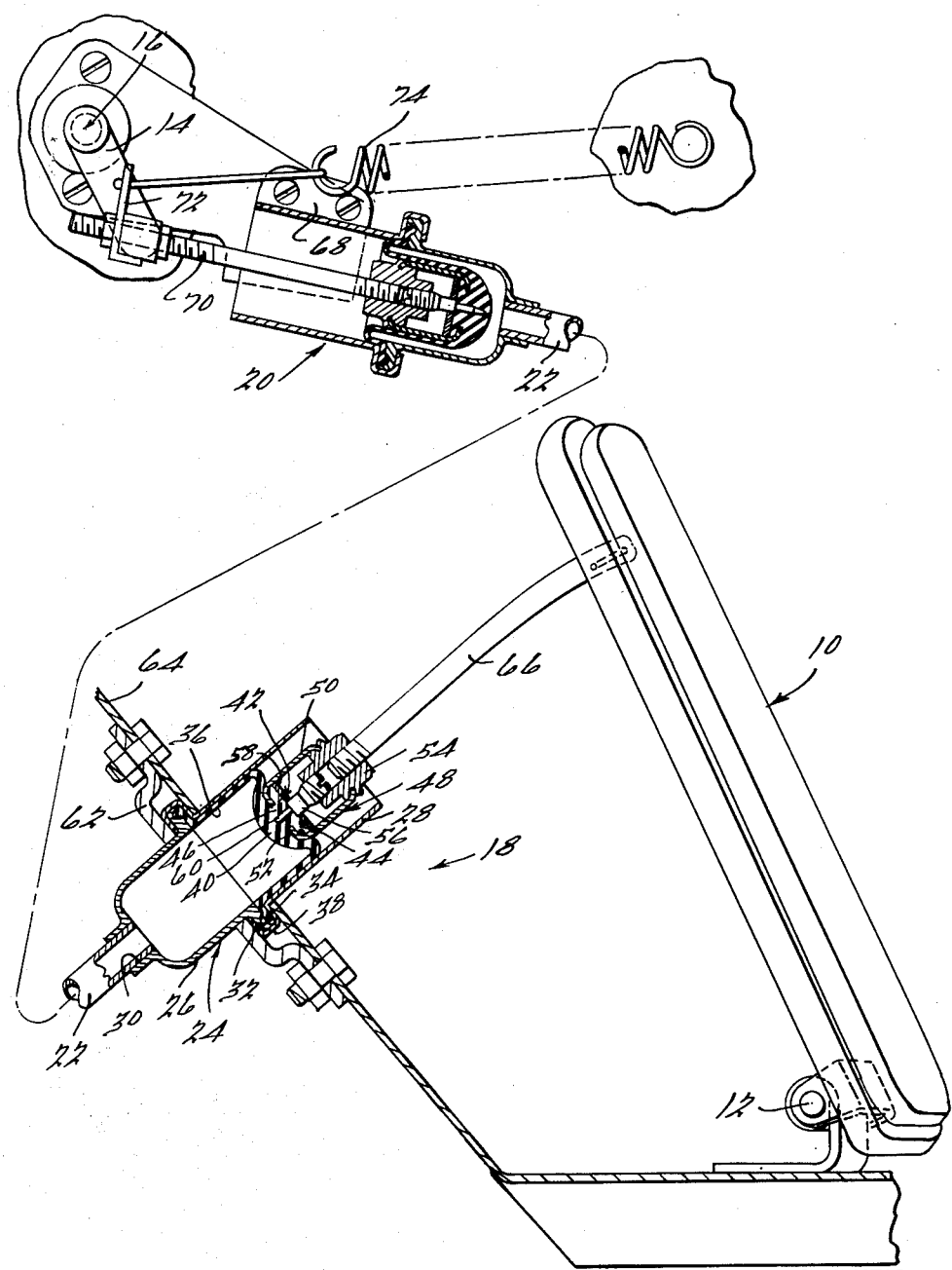
FIGURE 1 is a representation of a sealed hydrostatic force transmitting system, in partial section, embodying certain of the principles of the present invention and representatively utilized as an element of vehicular velocity or acceleration controlling system.

Certain of the principles of the invention may be advantageously applied to the control of a variety of fluids including gases, but for purposes of illustration those principles have been embodied in liquid-control systems and more particularly in sealed hydrostatic force transmitting systems.

The sealed hydrostatic system illustrated in FIG. 1 of the drawings is representatively shown to be applied to the transmission of movement of an accelerator pedal 10, pivoted about a pin 12, into movement of the actuating lever 14, pivoted about an axis 16, of a carburetor to control the velocity of an automotive vehicle or the like.

The sealed hydrostatic system includes an actuating transducer 18 actuated or driven by the throttle or accelerator pedal 10 for converting force applied thereto into liquid pressure, a responding transducer 20 coupled to the carburetor lever 14 for converting liquid pressure applied thereto into force, and a sealed liquid conduit 22 interjoining the two transducers.

The actuating transducer 18 includes a cylinder assembly 24 comprising a housing portion 26 and a body portion 28. The hollow housing portion 26 includes an extended-length output port 30, which is cemented or otherwise secured to one end of the conduit 22, and an outwardly projecting peripheral flange 32, which is provided with an annular groove to accept the beaded peripheral lip 34 of a rolling diaphragm or rolling lobe diaphragm 36.

The body portion 28 of the cylinder assembly 24 is illustrated to be cylindrical, and more particularly circular cylindrical, and to have a flange 38 which abuts the other surface of the beaded peripheral lip 34 to clamp that lip in a fixed position relative to the cylinder assembly 24. The flange 38 is crimped over the flange 32 around its periphery or at a plurality of points to retain the elements 26 and 28 together.

The portion of the diaphragm 36 between the lip 34 and the central portion 40 thereof serves as a rolling lobe the outer surface of which transfers between engagement with the inner wall of the portion 28 and the outer surface of a piston assembly 48 during operation of the system. A button 42 comprising a head portion 44 and a reduced diameter neck portion 46 is formed integrally with and projects from the central portion 40 of the diaphragm 36 and serves as the means for connecting the diaphragm 36 to the piston assembly 48. Piston assembly 48 comprises a piston 50 of generally tubular form having at one end an inturned flange 52 which is disposed adjacent the neck portion 46 of the diaphragm 36 and engages the inner or left hand (FIG. 1) or undersurface of the head portion 44 of the button 42. At the other end, the piston 50 is clinched or otherwise secured to a nut 54 into which a screw 56 is threaded. A shoulder on the screw 56 abuts a clamp member 58, which is in the form of a washer, and forces that clamp member towards the flange 52 to trap the head portion 44 of the button 42 therebetween.

The button 42 is or may be provided with a longitudinal aperture used in filling the system with liquid and the screw 56 is provided with a pointed central projection 60 which passes through the aperture in the clamp member 58 and engages the wall of the aperture in the button 42 to seal the aperture and to prevent leakage of fluid therethrough.

In assembly, the button 42 is inserted through the aperture defined by the edges of the flange 52 on the piston 50 and then the clamp member 58 is forced into engagement with the outer face of the head 44 of the button 42 by means of the screw 56 to so trap the button 42 that it will not thereafter pull through the aperture defined by the flange 52.

The actuating transducer 18 is supported in any suitable manner in an appropriate position relative to accelerator pedal 10 as by means of a clamp plate 62 secured to the fire wall 64 or the like of the vehicle and is coupled to the accelerator pedal 10 by means of an acuating rod 66 one end of which is engaged by the accelerator pedal and the other end of which is screwed into the nut 54.

The responding transducer 20 is or may be constructed similarly to the actuating transducer, as described, and is secured in a fixed or adjustably fixed position with respect to the carburetor by suitable means such as a bracket 68 and is connected to the actuating lever 14 of the carburetor by means such as a rod 70 which is threaded into the corresponding nut in the transducer 20. In the illustrated arrangement rod 70 further carries a bracket 72 to which the carburetor return spring 74 is secured, the other end of that spring being anchored with respect to the carburetor in any suitable fashion.

The apparatus of FIG. 1 is shown in the throttle closed position. When the accelerator pedal 10 is moved, the piston assembly 48 in the actuating transducer 18 is moved longitudinally to the left (in the view in FIG. 1) longitudinally of the cylinder assembly 24, and the outer surface of the diaphragm 36 rolls along the side wall of the piston body 50 during the process, with the position of the lobe traveling during the course of the movement. As a result, the cavity in the transducer 18 defined by a portion of the cylinder assembly and the diaphragm is reduced in size, forcing liquid along the conduit 22 and into the cavity in the responding transducer 20. The resultant increase in pressure within that cavity forces the diaphragm in the responder to move to the left (FIG. 1), moving the piston assembly of the responding transducer 20 to the left so as to move the carburetor lever 14 about the axis 16 towards the throttle open position. The return to the illustrated position occurs under the action of spring 74 when the throttle or accelerator pedal 10 is released.

While the illustrated sealed hydrostatic system is usable as a replacement for any conventional mechanical linkage or Bodin-wire linkage, its advantages are particularly significant where the distance between the actuating device, such as the accelerator pedal 10, and the responding device, such as the carburetor, is great as, for example, in rear-engine vehicles or tilt-cab trucks. In any sealed hydrostatic system, however, variations in the positions of the input or output rods occur as a result of changes in the ambient conditions, and particularly, changes in the ambient temperature conditions. In some circumstances, as where the experienced changes of conditions are large or where the length of the conduit is substantial those variations may prove excessive. In the arrangement of FIG. 1 the effects of ambient changes are minimized by selection of the liquid, by selection of the constituent materials of the apparatus, by constructing the units so that the piston assembly is disposed within the housing of the cylinder assembly and cooperates in defining the volume of the cavity in at least one of the transducers under all circumstances, or by a combination thereof.

Since the hydrostatic system is sealed, the characteristics of the liquid are reasonably critical. Its boiling point should be quite high (preferably above 275° Fahrenheit for automotive applications), its freezing point should be low (preferably below negative 40° Fahrenheit for automotive uses), its viscosity should be quite low over the entire range of operating temperatures and should preferably be no greater than 10 centipoise at zero degrees Fahrenheit and desirably two centipoise or less at 50° Fahrenheit, it should have low flammability and low toxicity, and it should be compatible with all of the materials with which it will make contact. The liquid should be stable under long exposure to temperature cycling and, should have a low coefficient of expansion. Among the investigated materials, normal nonane, normal hexanol, metaxylene, cyclohexane and normal propyl cyclohexane were found to best possess the foregoing desired characteristics and normal nonane is presently preferred. Its viscosity runs from about 2.24 centipoise at a minus 40° F. to about 0.236 centipoise at 135° F. and its coefficient of expansion is not excessive, its density running from about 0.772 gram per cubic centimeter at a negative 50° F. to about 0.620 gram per cubic centimeter at 135° F. The other noted liquids have satisfactorily low viscosity and satisfactorily low temperature coefficients of expansion.

In the illustrated closed-throttle position of the two piston assemblies, the piston assembly in the responding transducer 20 is majorly disposed within the housing portion of the cylinder assembly, and cooperates with the cylinder assembly and diaphragm to define a majorly tubular cavity. As the throttle is opened, the piston assembly of the responding transducer 20 is moved away from adjacency to the cylinder housing, but the piston assembly 48 of the actuating transducer 18 is then moved within the housing portion 28 of the cylinder assembly 24 to define a generally tubular cavity therein, that is, the cavity is of annular cross section over a substantial portion of its length. In intermediate positions of the two transducers, a portion of each of the piston assemblies is physically disposed within the associated cylinder assembly housings. A liquid is selected, as above noted, which desirably has a low thermal coefficient of volumetric expansion over the range of temperatures to which the assembly is to be subjected. In automotive use, the range of ambient temperatures may be quite substantial, as from considerably below zero degrees Fahrenheit to 260° Fahrenheit or more since the responding transducer is, in the environment illustrated in FIG. 1, proximate the vehicles' engine.

The presently preferred liquid, normal nonane, has a coefficient of volumetric expansion of approximately 0.00065 per degree F. It is then desirable to manufacture the housing portion 26 of the cylinder assembly 24 of the actuating transducer 18 and the corresponding housing portion of the responding transducer 20 as well as the conduit 22 of material having a quite substantial temperature coefficient of expansion so that the overall cavity will tend to expand at a rate approaching the rate of expansion of the liquid with increasing ambient temperatures. Further, by making the piston assemblies of materials having a relatively low temperature coefficient of expansion, the differential volume of the cavity increases, on a percentage basis, at a greater rate than if the piston assemblies did not constitute part of the means for defining the cavities. In the preferred arrangement, the piston 50 is formed of steel which has a relatively low temperature coefficient of cubical expansion of approximately 0.000018 per degree F. The housing portion 26 can be made, for example, of aluminum which has a temperature coefficient of cubical expansion about twice that of steel, but in the preferred construction, that housing portion is made of nylon which has a temperature coefficient of cubical expansion of approximately 0.00018 per degree F. which, it will be observed, is approximately ten times that of the steel piston assembly. This differential expansion of the steel and nylon parts which conjointly define the liquid cavity serves in substantial measure to compensate for the major effects of the thermal expansion of the liquid with increases in ambient temperature, unless the changes in the ambient temperature are excessive, or unless the total volume of liquid is inordinately large (due, for example, to the use of a very long conduit 22).

In the system illustrated in FIG. 2, the actuating transducer 70 is fixed in position by means of a bracket 72 and includes an actuating rod 74 which engages a recess 76 in a clutch pedal arm 78 which is pivoted at one end about a shaft 80 and carries a clutch pedal 82 at the other end. The actuating transducer 70 is coupled by means of a flexible sealed conduit 84 to a responding transducer 86 which is mounted in any suitable fashion to the transmission housing 88 or to the clutch housing 90 of the vehicle. Responding transducer 86 includes a piston rod 92 the end of which is seated in a socket 94 in a clutch lever 96 which is rotatable about the cross shaft 98 of the clutch and rotation of which controls the actuation of the clutch 90.

The responding transducer 86 comprises a cylinder assembly 100 including a body portion 102 and a housing portion 104. The housing portion 104 is a generally cup-shaped member having a central aperture 106 in the closed end thereof and, a peripheral flange 108 adjacent the other end having an annular recess 110 therein. The body portion 102 is hollow and generally cylindrical and includes an input port 112, to which the conduit 84 is connected, and a peripheral flange 114. The beaded peripheral lip 116 of a rolling lobe diaphragm 118 is trapped within the annular recess 110 in the housing portion 104 by means of the flange 114 on the body portion 102. The central portion of the diaphragm 118 is secured to the piston head 120 of a piston assembly 122 by means of a spring type clamp washer 124 which is secured to the piston head 120 by means of a screw 126. The spring type washer 124 exerts a force to retain the rolling lobe diaphragm 118 in clamped relationship with the peripheral edge of the piston head 120.

The left end of the tubular body portion 102 could be simply closed with a cover or cap, with securing means being provided to hold the cap, the body portion 102 and the housing portion 104 together, that securing means taking the form, for example, of a plurality of machine screws, such as screw 128, engaging peripheral apertures in the cover or cap, apertures in spaced bosses, such as boss 130 on the body portion 102, and threaded bosses in the peripheral flange 108 of the housing portion 104, and with the fluid cavity being defined by that cover plate, by the body portion 102 and by the diaphragm 118. However, under some circumstances it is desirable to provide means in the responding transducer to compensate for volumetric changes of the liquid resulting from changes in the ambient temperature conditions. This temperature compensating means may be the only temperature compensating means in the sealed hydrostatic system, or separate compensating means may be provided in both the actuating and responding transducers if desired, as, for example, in the circumstance in which the two transducers are or may be in substantially different temperature environments.

The means for compensating for changes in the volume of the liquid resulting from changes of the ambient temperature of the liquid within the cavity in the responding transducer illustrated in FIG. 2 comprises a compensating diaphragm 132 the periphery of which is clamped between the end of the body portion 102 and a flange 134 formed upon a cover or cap 136, with the aforementioned machine screws including screw 128 extending through apertures in flange 134 to secure the cover or cap 136, the body portion 102 and the housing portion 104 together as a unit. The curved ends of a bowed polymetallic element 138, are disposed between a shoulder 140 formed in the body portion 102 and a bearing washer 142 resting upon the diaphragm 132 and supported by the flange 134 of the cover 136. The central portion of the polymetallic element 138 is held in spaced relation with the central portion of the diaphragm 132 by means of a shouldered stud 146 which extends through central apertures in the diaphragm 132 and the polymetallic element 138 and carries a spacer element 148 which abuts both the diaphragm 132 and the polymetallic element 138.

The polymetallic element 138 may be, for example, a bimetallic strip having an appropriate temperature-change versus deflection characteristic. For example, strip 138 may be in the order of 0.035 inch thick, one half inch wide, and two inches long to produce a force change of about 2 ounces for each one degree Fahrenheit change of temperature of the liquid in the cavity. With the temperature compensating apparatus in place, as shown, it will be observed that the volume of the liquid cavity is defined primarily by the wall of the body portion 102, by the diaphragm 118 and by the diaphragm 132.

An increase in the temperature of the liquid will tend to cause the liquid to expand thereby tending to cause the piston assembly 122 to be moved to the right. However, by providing the disclosed temperature compensating mechanism, that same increase in the temperature of the fluid will cause the polymetallic element 138 to deflect its central portion to the left in the view of FIG. 1 to drive the center of the diaphragm 132 to the left to correspondingly and compensatingly increase the volume of the cavity. This is accomplished by forming the polymetallic element 138 with the high expansion portion on the concave or left-hand face. Conversely, with a reduction of the temperature of the liquid in the cavity and a corresponding reduction of the effective volume of that liquid, the polymetallic element 138 bows to draw the central portion of the diaphragm 132 to the right to again compensate for the effects which would otherwise be produced by the volumetric change of the liquid in response to the change in the temperature thereof.

Since the flexible diaphragm 132 flexes in response to the force exerted thereon by the polymetallic element 138, diaphragm 132 also tends to flex in response to an increase in the fluid pressure within the cavity. It will be apparent that the application of an increased fluid pressure within the cavity in order to create a force to move the piston assembly 122 to the right would also tend to flex the diaphragm 132 to the left and reduce the effectiveness of the system. Accordingly, the temperature compensating apparatus should preferably be locked against such movement whenever the sealed hydrostatic system is being utilized to transmit forces. Otherwise, stated, the temperature compensation should be accomplished when the system is not being actively utilized to transmit forces and should be locked or disabled to move during the force transmitting utilization of the system to prevent improper interference with the operation of the system. As will be seen, it is feasible to lock the temperature compensating mechanism provided at the actuating transducer 70 in response to the movement of the actuating lever, but in the responding transducer, it is more feasible to lock the temperature compensating apparatus against improper movement during the force transmitting operation of the system in response to the change of pressure in the responding transducer's liquid cavity which attends the application of force to the actuating transducer. In the arrangement illustrated in FIG. 2, this is accomplished by locking the diaphragm 132 against movement in response to a force-induced change of the pressure. To this end, a member 150, provided with an axial bore 152, is secured to the diaphragm 132 as by being formed integrally with the stud 146. Member 150 serves as a ball cage, being provided with a plurality of circumferential apertures each of which accepts a ball such as balls 154 and 156. A locking stem 158 is fixed to the cover 136 and extends coaxially of and within the bore 152 in the member 150 and serves as an inner race engaged by the balls including balls 154 and 156. A lock-up element 160 is mounted outside of the member 150 and includes a generally cylindrical bore portion 162 engaging the outer wall of the member 150 and a peripheral shoulder 164 engageable with a shoulder formed on the member 150 adjacent the diaphragm 132.

Lock-up element 160 is further provided with an enlarged annular flange 168 engageable with an annular surface of the rear face of the diaphragm 132 substantially spaced from the center of that diaphragm. The lock-up element 160 is further provided with a tapered bore portion 170 defining an outer or locking race engageable with the balls including balls 154 and 156. A compression spring 172 acts between a seat formed at the end of the lock-up element 160 and a seat defined by a snap ring or the like secured to the member 150.

When the transducer 86 is not functioning to convert or translate changes of liquid pressure into force or vice versa, variations of the positions of the polymetallic element 138 in response to changes of the temperature of the liquid will produce movement of the diaphragm 132, member 150, lock-up element 160, and the balls including balls 154 and 156 all as a unit, there being no relative longitudinal movement between member 150 and element 160. Movement of the member 150 to the left will produce corresponding movement of the lock-up element 160 by virtue of the engagement between the shoulder 164 on the element 160 and the member 150, and movement of the member 150 to the right, in the view of FIG. 2, will result in corresponding movement to the right of the lock-up element 160 by virtue of the force applied thereto through the spring 172.

When the responding transducer 86 is placed in use to convert changes of liquid pressure into force upon and movement of the piston assembly 122, the resultant increase of pressure of the liquid within the cavity acting upon the right hand face of the diaphragm 132 tends to move that diaphragm to the left. However, the polymetallic element 138 is at a position determined by the then liquid temperature and any movement of the central portion of the diaphragm 132 to the left in response to the increased liquid pressure is opposed by the spring or beam action of the polymetallic element 138 so that movement of the central portion of the diaphragm 132 to the left under this condition is impeded. The free portions of the diaphragm 132 are, however, not impeded to the same degree and hence the portions of the diaphragm which are in engagement with the enlarged annular flange 168 of the element 160 tend to deflect to the left in the view of FIG. 1 to a greater degree than the central portion of that diaphragm 132 and this movement produces corresponding movement to the left of the lock-up element 160 relative to the member 150.

The movement of the lock-up element 160 to the left against the relatively light force exerted by spring 172 will cause the tapered bore portions 170 to engage the balls including balls 154 and 156 with increasing force until those balls are tightly wedged between the surface 170 and the surface of stem 158. When this occurs, the element 160 is effectively locked to the stem 158 through the action of the balls and the ball cage member 150 is also locked against movement. Since the locking stem 158 is fixed with respect to the cover 136, the diaphragm 132 will move to the left but a slight amount in response to the increase in liquid pressure and thereafter diaphragm 132 will act effectively as a rigid cavity wall so that the increase in liquid pressure will produce only movement of the piston assembly 122 to the right.

The diaphragm 132 will remain locked in position until the pressure of the liquid is reduced to the normal value. When this occurs, the leftward force acting upon the annular flange 168 of the lock-up element 160 becomes less than the force exerted by the spring 172 in a direction tending to move the element 160 to the right, and that movement occurs, freeing the locking engagement between the camming surface 170 and the balls and restoring the elements to the positions illustrated in the drawing. Thereafter, member 150 and element 160 will continue to move as an entity under the control of the polymetallic element 138 to adjust the volume of the cavity to compensate for changes in the temperature of the liquid until the transducer is again called upon to translate changes in liquid pressure into force.

It will therefore be observed that in the apparatus employed in the responding transducer 86 in the system of FIG. 2, compensation for the effects of the temperature-change induced changes of the volume of the liquid is accomplished by sensing the temperature of the liquid, and the compensating means is disabled to change the effective volume of the cavity in response to changes of the liquid pressure by providing means responsive to those changes of liquid pressure to lock the compensating diaphragm against movement. It will also be observed that the use of an enlarged annular flange 168 upon the member 160 to sense the changes of liquid pressure also serves, when the system is locked, to rigidify and reinforce the diaphragm 132 when the transducer is in use.

The actuating transducer 70 comprises a cylinder assembly 180 including a body portion 182 and a housing portion 184 which have abutting flanges to clamp the peripheral bead 186 of the rolling-lobe diaphragm 188 therebetween in a manner similar to that above described in connection with the responding transducer 86. The central portion of the rolling-lobe diaphragm 188 is clamped to the face of the piston head 190 of the piston assembly 192 by means of a clamping plate 194 which is retained upon and biased towards piston head 190 by means of a centrally apertured nut 196 which threadedly engages the threaded portion 198 of a blind bore 200 which extends axially of the piston assembly 192 and into the piston rod portion 202 thereof. The piston rod 202 extends through an aperture 204 in the closed end of the housing portion 184 and is biased towards the clutch pedal arm 78 by means of a compression spring 206 one end of which engages an annular seat 208 in the housing portion 184 and the other end of which abuts a washer 210 which is secured to the piston rod 202 by means such as a C washer 212.

A stem 214 extends through the central aperture in the nut 196 and carries a flanged spring guide and seat 216 upon the end thereof. A spring 218, disposed within the bore 200 in the piston assembly 192, seats at one end against the head of the spring guide 216 and at the other end extends into engagement with the end of the blind bore 200.

Stem 214 carries at its other end a valve member 220 having a thin annular valve face 222 which is engageable with a valve seat 224. If the valve member 220 is metallic, it may be advantageous to make the valve seat 224 of a more resilient material such as hard rubber to insure a good seal.

Valve seat 224 is sandwiched with a diaphragm 226 and diaphragm clamping plates 228 and 230 by means of an eyelet 232 having a controlled-size hole therethrough, the diameter of which has been somewhat exaggerated in the drawings for purposes of illustration. The peripheral lip 236 of the diaphragm 226 is clamped between the end face of the body portion 182 and a flange 238 on a compensator body portion 240. A compression spring 242 is trapped within a bore 244 in the valve member 220 and acts against the enlarged head 246 of the stem 214 (which is secured to the valve member 220) at one end of the bore and, at the other end, against the enlarged head of a valve stem 248 which carries at its other end a ball valve 250.

The ball valve 250 is adapted to sealingly engage a valve seat 256 formed at the edge of a central aperture in a crossweb 258 formed integrally with the compensator body portion 240. The compensator body portion 240 is provided with a port 260, entering into the region above the web 258, to which the flexible conduit 84 is connected and sealed.

Beyond the web 258, the peripheral lip of a compensating diaphragm 262 is trapped between the annular end of the compensator body portion 240 and a surface of a cover plate 264. The assembly including the cover plate 264, the compensator body portion 240, the body portion 182 and the housing portion 184 is secured together in any suitable fashion such as by means of a plurality of machine screws including machine screw 266.

A reduced diameter projecting portion 268 of a stem 270 extends through aligned central apertures in the diaphragm 262 and in the diaphragm clamping plates 272 and 274 and the remote end is peened over or otherwise secured to the central portion of a polymetallic element 276 which is held in spaced relation to the diaphragm 262 by means of spacer 278. The ends of the polymetallic strip 276 are trapped between a shoulder 280 formed at the end of the compensator body portion 240 and a bearing washer 290 which is fixed in position by the cover plate 264.

The stem 270 extends through an aperture in the cover plate 264 and is longitudinally apertured to serve as a port for filling the system with liquid. A sealing valve 292 threadedly engages the aperture in the stem 270 and serves to close the system against the egress of liquid.

When the actuating transducer 70 is in the illustrated position, the effective liquid cavity includes a first cavity portion 294 majorly defined by the inner walls of the body portion 182 and the rolling-lobe diaphragm 188, a second cavity portion 296 majorly defined by walls of the compensator body portion 240 and the diaphragm 226, and a third cavity portion 298 defined primarily by wall portions of the compensator body portion 240 and the diaphragm 262.

The third cavity portion 298 may serve as a liquid reservoir if the system is overfilled to pre-stress the polymetallic element 276. However, its primary function is to serve as a part of the means for compensating against the effects which would otherwise be produced by the change of the effective volume of the liquid resulting from a change in the temperature of that liquid. The polymetallic element 276 is in good heat transfer relation with the liquid in the cavity 298 and hence tends to assume the same temperature. In response to an increase in that temperature, the polymetallic element 276 tends to straighten to deflect the central portion of the diaphragm 262 to the left (FIG. 2) to increase the effective volume of the cavity portion 298 and to correspondingly increase the effective volume of the entire system, thereby preventing the increase in the liquid volume resulting from an increase in its temperature from being reflected in a change of position of the piston assembly in the responder transducer. Conversely, if the temperature of the liquid within the cavity portion 298 falls, polymetallic element 276 assumes a greater degree of bow and moves the diaphragm 262 to the right to compensatingly reduce the effective volume of the cavity portion 298 and hence of the system.

It will be recalled that the means provided in the responding transducer 86 for locking the ambient temperature compensating diaphragm therein against improperly affecting the functioning of the responding transducer is actuated in response to significant changes of the liquid pressure, and a similar locking means could, if desired, be utilized in connection with the actuating transducer 70. However, since the actuating transducer 70 is located proximate the clutch pedal arm 78 and since parts therein are moved in response to movement of the clutch pedal arm 78, the fact of that movement may be utilized as the indication that the system is being placed in use and hence as an indication that the temperature compensating apparatus should be disabled until the use of the system is completed.

In the illustrated arrangement, the effective disabling of the temperature compensating means in the actuating transducer 70 is accomplished by the closure of the ball valve 250 against the ball valve seat 256. Rotation of the clutch pedal arm 78 about its axis 80 as a result of the application of force to the clutch pedal 82 produces a leftward (in the showing of FIG. 2) movement of the piston rod 74 against the restoring action of spring 206. This movement of the piston assembly 192 is communicated through spring 218 to stem 214 to correspondingly move the valve member 220. This movement of the valve member 220 is communicated through spring 242 to the valve stem 248 and hence to the ball valve 250 so that early in the stroke of movement of the clutch pedal arm 78 the ball valve 250 closes against the valve seat 256. Each additional increment of movement of the clutch pedal arm 78 increases the pressure in the first and second cavity portions 294¹ and 296 and this pressure tends to retain the ball valve in intimate and sealing engagement with the valve seat 250. Upon the closure of the ball valve 250 to its valve seat, the third cavity portion 298 is effectively isolated from the first and second cavity portions so that the third cavity portion 298 is no longer an effective part of the force transmitting system and the diaphragm 262 will not be flexed in response to the increase in pressure in the system.

The engagement of the ball valve 250 with the valve seat 256 will not effectively impede further movement of the piston assembly 192 and the valve member 220 since the connection between the valve member 220 and the valve stem 248 is through the spring 242 which will compress during the period of any further movement of the valve member 220.

When the force is relieved from the pedal 82 to permit clutch pedal arm 78 to rotate about its axis 80 towards and to its illustrated position, the piston assembly 192 is restored to its illustrated position by the action of spring 206 and the ball valve 250 is unseated from the ball seat 256 to re-establish communication between the third cavity portion 298 and the first and second cavity portions 294¹ and 296 to again enable the temperature compensating apparatus to perform its function throughout the period that the force transmitting system is idle.

While the principles of the invention are of broader applicability, the system of FIGURE 2 is representatively illustrated for use in actuating the clutch of a vehicle and is particularly useful where the distance between the clutch and the clutch pedal is such as to complicate the use of mechanical linkage therebetween. The illustrated arrangement, however, has another advantage over conventional clutch actuators and particularly over clutch actuators used on heavier vehicles such as trucks in which the forces of engagement between the clutch members must be quite substantial to prevent slippage. In typical heavier vehicles the force which must be exerted by the piston rod 92 of the responding transducer 86 upon the lever 96 may be in the order of 450 pounds. If the effective area (the area against which the liquid pressure effectively acts) of the rolling-lobe diaphragm 118 in the responding transducer 86, is, for example, 4½ square inches, the pressure of the liquid within the system must reach 100 pounds per square inch to exert the requisite forces, and if the effective area of the rolling-lobe diaphragm 188 in the actuating transducer 70 is also 4½ square inches, a force of 450 pounds must be exerted upon the piston rod to produce the desired output force. In a representative heavier vehicle, the ratio of the lever arm between the pedal 82 and the axis 80 to the lever arm between the socket 76 and the axis 80 is, for example, 6.22 to 1, which means that a force of approximately 72 pounds must be applied to the clutch pedal 82 to produce disengagement of the clutch. A similar force would be required with conventional mechanical clutch linkages with the same pedal and clutch plate movements. The drivers are capable of exerting forces of this magnitude to disengage the clutch but it has been found that most drivers are able to hold the clutch depressed for but a limited time before their leg tires excessively. Consequently, it would be desirable to provide some sort of a holding means to assist the driver to maintain the clutch pedal in a depressed position and to reduce the magnitude of the effort which must otherwise be exerted by the driver. This function is fulfilled, in the arrangement of FIG. 2, by means including the valve member 220 and its valve seat 224. As will be seen, this means is effectively to reduce the magnitude of the force which the driver must exert to maintain the clutch lever in a given static position after the clutch pedal has traveled a sufficient distance to disengage the clutch. Under dynamic conditions, that is, when the clutch pedal arm 78 is moving, this means is not effective to reduce the force which must be applied by the driver.

When the clutch pedal 82 is depressed sufficiently, the nut 196 of the piston assembly 192 moves into abutment with the valve member 220 and drives that valve member beyond the face of the partial web 296 and toward the valve seat 224. However, the reduction of the size of the first cavity portion 294¹ as a result of the movement of the piston assembly 192 forces liquid to flow through the controlled-size aperture in the eyelet 232 and into the second cavity portion 296. This dynamic liquid flow through the aperture creates a pressure difference between the two faces of the diaphragm 226 which causes the assembly including the diaphragm 226 to move leftwardly (FIG. 2) against the opposing force of a spring 294 which acts between the web 258 and the lower diaphragm clamp washer 230. Diaphragm 226 moves to a position determined by equilibrium between the rate of the liquid flow and force of the spring 294. The assembly including the diaphragm 226 will deflect to maintain whatever gap is required between the face 222 of the valve 220 and the valve seat 224 to maintain that liquid pressure differential between the opposing faces of the diaphragm 226 which is called for by the compressed spring 294. In the preferred practice, this pressure differential and the rate of spring 294 are both quite small.

The condition of the apparatus during this movement of the piston assembly 192 is illustrated in the fragmentary view of FIG. 3 of the drawing. In that view, ball valve 250 is shown to be firmly seated against the valve seat 256, with the stem 248 having partially compressed the spring 242 with the valve face 222 of the valve member 220 spaced from the valve seat 224, with the face of the valve member 220 moved beyond the level of the partial web 296 as a result of the driving engagement between the nut 196 and the member 220, with the assembly including the diaphragm 226 deflected against the restoring force of spring 294, and with the spring 218 compressed. The arrows connote the direction and course of the liquid flow and it is important to understand that the condition represented in FIG. 3 is a dynamic (rather than a static) condition in which the piston assembly 192 is moving, although the apparatus is illustrated near the end of the stroke.

As soon as the dynamic condition terminates and a static condition prevails as by the driver terminating further downward movement of the pedal 82 (that is terminating movement in a direction to disengage the clutch) the flow of fluid past the face 222 of the valve member 220 and through the aperture in the eyelet 232 terminates, reducing the pressure differential across the diaphragm 226 to zero. When this occurs, the spring 294 moves the assembly including the diaphragm 226 to the right (FIG. 3) until the valve seat 224 is in engagement with the face 222 of the valve member 220. This condition is illustrated in the fragmentary view of FIG. 4 of the drawing. With this static condition prevailing, the pressure in the second cavity portion 296 remains at the aforesaid value of, for example, 100 pounds per square inch. This pressure is acting against a portion of the undersurface of the diaphragm 226 and against a portion of the undersurface of the valve member 220. The total area against which this pressure is acting is selected to be appreciably smaller than the effective area of rolling-lobe diaphragm 188, and in a representative case, this area was selected to be 1.8 square inches. As a result, the force applied as the result of the liquid pressure in the second cavity portion 296 is 180 pounds which is applied via the nut 196 and the piston assembly 192 to the socket 76 (FIG. 2) of the clutch pedal arm 78, resulting, with the aforesaid lever arm ratio, in the application of an upward or restoring force upon the pedal 82 of but about 29 pounds, that is, the driver can maintain the clutch statically disengaged by applying 29 pounds of force upon the clutch pedal 82. It will be observed that the magnitude of the force required to maintain the clutch de-energized under static conditions may be varied at will by appropriate selection of the areas against which the pressure in the second cavity portion 296 acts.

When the driver reduces the force applied to the pedal 82 preparatory to re-engaging the clutch, the piston assembly 192 moves to the right (in the illustration) and the valve member 220, the valve seat 224 and the diaphragm 226 moves to the right as a unit, with the valve face 222 remaining in sealing engagement with the valve seat 224. However, when the diaphragm and valve seat assembly has moved to the point at which the lip of the diaphragm clamp washer 228 strikes the partial web 296 (the position illustrated in FIG. 2), further movement of the valve seat 224 terminates and continued movement of the piston assembly will result in separation of the valve face 222 of the valve member 220 from the valve seat 224. It will be observed that since the pressure of the liquid in the second cavity portion 296 is exerted against a portion of the undersurface of the valve member 220, that pressure will tend to move the valve member 220 away from its seat 224 at this time.

When this occurs, communication is re-established between the first cavity portion $294^1$ and the second cavity portion 296 and the liquid pressure is then again exerted against the full effective area of the rolling-lobe diaphragm 188 so that the full restoring force is again applied through the clutch pedal arm 78 to the clutch pedal 73 and the driver must exert sufficient force to permit a controlled retraction against an effective upward force of 73 pounds acting against his foot.

In the preferred practice, the distance which the piston assemblies move until opening of the valve occurs is very short and for the purposes hereof, the piston assemblies may be considered to be effectively stationary throughout the time that the valve is closed.

It will be observed (FIGS. 3 and 4) that the shank 221 of the valve member 220 is provided, near the head end, with an enlarged diameter portion 298 which is closer in size to, but still smaller than, the aperture and the eyelet 232. Preferably, the transition between the smaller diameter portion of the shank 221 and the larger diameter portion 298 is gradual, as illustrated in the drawings. By virtue of this arrangement, as the face 222 of the valve member 220 separates from the valve seat 224 during the return of clutch-reengaging movement, the reinstitution of fluid flow through the aperture in the eyelet 232 and between the valve face 222 and valve seat 224 is modulatingly or gradually accomplished.

It will be apparent that the point in the stroke at which the means for changing the force required to maintain the system in static condition is effective may be varied over a substantial range as can the magnitude of the forces applied during the static condition.

The modified means for compensating for the effects of the change in volume of the liquid in response to changes in the temperature thereof illustrated in FIG. 5 of the drawings is an alternative to the arrangement illustrated in conjunction with the actuating transducer 70 in FIG. 2 of the drawings, and the omitted portions of the transducer in FIG. 5 are or may be identical to the correponding portions of transducer 70. In this arrangement, the polymetallic element 276 illustrated in FIG. 2 is omitted and a coil spring 302 is added. This spring operates between the cover plate 264' and the lower diaphragm clamping plate 272' and exerts a continuing force to the right upon the diaphragm 262'. With liquid in the system, the diaphragm 262' is slightly depressed or moved to the left. As the volume of the liquid reduces due to a decrease in the temperature of the liquid, the spring 302 expands to force the diaphragm 262' to the right to correspondingly and compensatingly reduce the effective volume of the system. Conversely, when the liquid expands as a result of an increase in temperature, the increased pressure upon the diaphragm 262' tends to move it leftwardly against the force of spring 302 to correspondingly increase the effective volume of the system. It will be observed that by filling the system under pressure, that is, by applying excess liquid to the system during its initial filling so as to force the diaphragm substantially to the left against the restoring force of the spring 302, the apparatus in FIG. 5 may also serve as a reservoir to compensate for leakage of the liquid.

The stem 270' which is connected to and supported by diaphragm 262' projects through an aperture in the cover portion, 264' and may, in this arrangement, be utilized as an indicator of the quantity of the liquid in the system, since reductions in the quantity of the liquid in the system will cause the stem 270' to move inwardly through the aperture in the cover plate 264'. If desired, the stem 270' may be provided with a mark indicating when refilling of the system is required.

It will be appreciated that the several temperature compensating means may have other utilizations than in the representative embodiments which have been illustrated, that in some cases no temperature compensation will be required, that in many cases temperature compensation of the system at one point in the system will be adequate, and that in other instances such as when the actuating and responding transducers are in quite substantially different temperature environments, or where the conduit therebetween is of very substantial length, temperature conpensation may be required at both the actuating and responding transducers. It will further be appreciated that the illustrated means for changing the forces under dynamic and static conditions may be modified and that they may be applied to a variety of systems.

While it will be appreciated that the embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In a sealed force transmitting hydrostatic system for association with an actuating device and a responding device, and including an actuating transducer for converting force applied thereto by the actuating device into liquid pressure and a responding transducer for converting liquid pressure applied thereto into force appliable to the responding device, the improvement in which each of said transducers comprises a hollow cylinder assembly having an interior wall surface and a cavity therewithin, a rolling lobe diaphragm having a peripheral lip fixed with respect to said cylinder assembly, and a piston secured to said diaphragm and movable longitudinally of said cylinder assembly and substantially coaxially therewith and connectable to one of the actuating and responding devices; said diaphragm having a surface engageable with the interior wall surface of said cylinder assembly and with said piston and transferring from one to the other during movement of said piston longitudinally of said cylinder assembly and having a rolling lobe between said interior wall surface of said cylinder assembly and said piston; a sealed liquid conduit sealed to and interjoining said cavities of said transducers, a liquid having a temperature coefficient of expansion filling said cavities and said conduit, the effective volumes of said cavities varying inversely with one another as said pistons move during operation of the system, each of said pistons being movable to a position within its associated cylinder assembly to cause the cavity to be generally tubular in form over a portion of its length, at least one of said tubular formed cavities existing at all conditions of operation of the system, said cylinder assembly of at least one of said transducers having a higher temperature coefficient of expansion than the piston thereof for increasing hte percentage differential rate of volume change of the cavity with a change in temperature.

2. The combination of claim 1 in which each of said cylinder assemblies has a temperature coefficient of cubical expansion which is many times greater than that of the associated piston.

3. The combination of claim 2 in which said liquid is selected from the group consisting of metaxylene, hexanol, cyclohexane, normal propyl cyclohexane and normal nonane.

4. The combination of claim 1 in which said pistons are cylindrical and have an outer diameter but little smaller than the inner diameter of said cylinder and in which the thickness of said tubular portions of each of said cavities is small, spring means for biasing said diaphragm in a direction to tend to reduce the effective volume of the cavity, in which said diaphragm is positioned in response to changes of the fluid pressure acting thereagainst, and in which the position of the diaphragm is determined by equilibrium between the instant force exerted by the fluid on one face thereof and the opposing force exerted by said spring means on the other face thereof.

5. In a sealed force-transmitting hydrostatic system for association with an actuating device and a responding device and including an actuating transducer for converting force applied thereto by the actuating device into liquid pressure and a responding transducer for converting liquid pressure applied thereto into force appliable to the responding device, the improvement in which each of said transducers comprises a hollow cylinder assembly having an interior wall surface and a cavity therewithin, a rolling lobe diaphragm having a peripheral lip fixed with respect to said cylinder assembly, and a piston secured to said diaphragm and movable longitudinally of said cylinder assembly and substantially coaxially therewith and connectable to one of the actuating and responding devices; said diaphragm having a surface engageable with interior wall surface of said cylinder assembly and with said piston and transferring from one to the other during movement of said piston longitudinally of said cylinder assembly and having a rolling lobe between said interior wall surface of said cylinder assembly and said piston; a sealed liquid conduit sealed to and interjoining said cavities of said transducers; and a liquid filling said cavities and said conduit, the total volume of the sealed hydrostatic system including said cavities and said conduit varying directly with variations of the inner cross sectional area of portions of both of said cylinder assemblies and inversely with variations in the cross sectional area of a portion of at least one of said pistons, said portion of at least one of said cylinder assemblies having a higher temperature coefficient of expansion than said portion of the associated piston.

6. The combination of claim 5 in which said portion of said at least one of said cylinder assemblies is formed of a plastic and in which said piston is formed of a metal having a temperature coefficient of expansion many times less than said plastic.

7. The combination of claim 6 in which said plastic is nylon and said metal is steel.

8. The combination of claim 7 in which said liquid is selected from the group consisting of meta-xylene, hexanol, cyclohexane, normal propyl cyclohexane and normal nonane.

9. In a sealed force-transmitting hydrostatic system for association with an actuating device and a responding device and including an actuating transducer for converting force applied thereto by the actuating device into liquid pressure and a responding transducer for converting liquid pressure applied thereto into force appliable to the responding device, the improvement in which each of said transducers comprises a hollow cylinder assembly having an interior wall surface and a cavity therewithin, a rolling lobe diaphragm having a peripheral lip fixed with respect to said cylinder assembly, and a piston secured to said diaphragm and movable longitudinally of said cylinder assembly and substantially coaxially therewith and connectable to one of the actuating and responding devices; said diaphragm having a surface engageable with the interior wall surface of said cylinder assembly and with said piston and transferring from one to the other during movement of said piston longitudinally of said cylinder assembly and having a rolling lobe between said interior wall surface of said cylinder assembly and said piston; a sealed liquid conduit sealed to and interjoining said cavities of said transducers; a liquid filling said cavities and said conduit, the total volume of the sealed hydrostatic system including said cavities and said conduit varying directly with variations of the inner cross sectional area of portions of both of said cylinder assemblies and inversely with variations in the cross sectional area of portions of both of said pistons, said portion of both of said cylinder assemblies and said conduit having a higher temperature coefficient of expansion than said portions of said pistons.

10. The combination of claim 9 in which said portions of both of said cylinder assemblies and said conduit are nylon and in which said portions of said pistons are metallic.

11. In a sealed force-transmitting hydrostatic system for association with an actuating device and a responding device, the combination of an actuating transducer for converting force applied thereto by the actuating device into liquid pressure; a responding transducer for converting liquid pressure applied thereto into force appliable to the responding device, each of said transducers comprising a hollow cylinder assembly having an interior wall surface and a cavity therewithin, a rolling lobe diaphragm having a peripheral lip fixed with respect to said cylinder assembly, and a piston secured to said diaphragm and movable longitudinally of said cylinder assembly and connectable to one of the actuating and responding devices, said diaphragm having a surface engageable with the interior wall surface of said cylinder assembly and with said piston and transferring from one to the other during movement of said piston longitudinally of said cylinder assembly and having a rolling lobe between said interior wall surface of said cylinder assembly and said piston; a sealed liquid conduit sealed to and interjoining said cavities of said transducers; and a liquid filling said cavities and said conduit selected from the group consisting of metaxylene, hexanol, cyclohexane, normal propyl cyclohexane and normal nonane.

12. The combination of claim 11 in which said liquid is normal nonane.

13. A rolling lobe diaphragm comprising a peripheral lip portion, a central portion, a rolling lobe portion between said lip portion and said central portion, and a projecting button portion integral with and projecting from said central portion and including a neck portion adjacent said central portion and a head portion supported by said neck portion and larger in size in at least one lateral dimension than said neck portion.

14. In a piston assembly for association with a rolling lobe diaphragm having a centrally disposed integral projecting button portion including a head portion having a face surface and a necked-down support portion connected to and adjacent an undersurface of the head portion, the combination of a hollow body portion adapted to accept the button within one end thereof, flange means at said one end of said body portion adapted to engage the undersurface of the head portion of the projecting button, a clamp member disposed within said hollow body portion and engageable with the face surface of the head portion of the button portion, and means cooperating with said body portion for forcing said clamp member towards said flange means to clamp the head portion of the button portion therebetween.

15. In a piston assembly for association with a rolling lobe diaphragm having a centrally disposed integral projecting button portion including a head portion having a face surface and a necked-down support portion connected to and adjacent an undersurface of the head portion, the combination of a hollow body portion adapted to accept the button within one end thereof, flange means at said one end of said body portion adapted to engage the undersurface of the head portion of the projecting button, a clamp member disposed within said hollow body portion and engageable with the face surface of the head portion of the button portion, and means cooperating with said body portion for forcing said clamp member towards said flange means to clamp the head portion of the button portion therebetween comprising a nut secured to said body portion and a screw threadedly engaging said nut and engageable with said clamp member.

16. In a rolling lobe and piston subassembly for association with a cylinder assembly to form a transducer, the combination of a rolling lobe diaphragm comprising a peripheral lip portion, a central portion, a rolling lobe portion between said lip portion and said central portion, and a projecting button portion integral with and projecting from said central portion and including a neck portion adjacent said central portion and a head portion supported by said neck portion and having a face surface remote from and an undersurface adjacent said neck portion, and a piston assembly comprising a hollow body portion adapted to accept said head portion within one end thereof, flange means at one end of said body portion engaging said undersurface of said head portion, a clamp member disposed within said hollow body portion and engaging said face surface of said head portion, and clamping means cooperating with said body portion for forcing said clamp member towards said flange means to clamp said head portion therebetween.

17. The combination of claim 16 in which a filling aperture extends through said head portion through said neck portion and through said central portion, in which said clamp member has an aperture aligned with said filling aperture, and in which said clamping means includes a screw having a shoulder bearing against said clamp member adjacent the aperture therein and a portion projecting through said aperture in said clamp member and into sealing engagement with the wall of said filling aperture.

18. In a transducer for converting changes of fluid pressure into force or vice versa and including a body portion and a flexible member constituting wall portions of a fluid cavity, means for compensating for the effects of the change of volume of the fluid produced by changes of the temperature thereof comprising a diaphragm constituting at least at times another wall portion of the fluid cavity and movable in a direction to enlarge the effective volume of the cavity in response to a temperature-induced increase in the volume of the fluid and in a direction to reduce the effective volume of the cavity in response to a temperature-induced decrease in the volume of the fluid, a hollow stem secured to and supported by said diaphragm for conveying fluid into the cavity during filling thereof, and means for sealing said stem to prevent egress of the fluid therethrough, said stem projecting from the body portion and indicating the effective volume of the fluid.

19. In a transducer for converting changes of fluid pressure into force or vice versa and including a body portion and a flexible member constituting wall portions of a fluid cavity, means for compensating for the effects of expansion and contraction of the fluid in response to changes of the temperature thereof comprising a diaphragm constituting at least at times another wall portion of the fluid cavity, and a mechanical temperature responsive member in heat transfer relationship with the fluid and mechanically coupled to said diaphragm for moving said diaphragm in a direction to enlarge the effective volume of the cavity in response to an increase in the temperature of said temperature responsive member and in a direction to reduce the effective volume of the cavity in response to a decrease in the temperature of said temperature responsive member.

20. The combination of claim 19 in which said temperature responsive member is a polymetallic element having a central portion fixed with respect to the central portion of said diaphragm and tip portions effectively fixed with respect to the body portion.

21. In a transducer for at times converting changes of fluid pressure into force or vice versa and including a body portion and a flexible member constituting wall portions of a fluid cavity, the combination of compensating means for compensating for the effects of temperature-induced changes of the volume of the fluid comprising a diaphragm constituting at least at times another wall portion of the fluid cavity and movable in a direction to enlarge the effective volume of the cavity in response to a temperature-induced increase in the volume of the fluid and in a direction to reduce the effective volume of the cavity in response to a temperature-induced decrease in the volume of the fluid, and means for disabling said compensating means to change the effective volume of the cavity whenever said transducer is converting changes of fluid pressure into force or vice versa comprising mechanical means engageable with said diaphragm and responsive to pressure changes of the fluid on said diaphragm for locking at least a portion of said diaphragm against movement.

22. In a transducer for at times converting changes of fluid pressure into force or vice versa and including a body portion and a flexible member constituting wall portions of a fluid cavity, the combination of compensating means for compensating for the effects of expansion and contraction of the fluid in response to changes of the temperature thereof comprising a diaphragm constituting at least at times another wall portion of the fluid cavity, temperature responsive means in heat transfer relation with the fluid for changing the position of said diaphragm to change the effective volume of the cavity in accordance with the temperature of said temperature responsive means, and means for disabling said compensating means to change the effective volume of the cavity whenever said transducer is converting changes of fluid pressure into force or vice versa.

23. In a transducer for at times converting changes of fluid pressure into force or vice versa and including a body portion and a flexible member constituting wall portions of a fluid cavity, the combination of compensating means for compensating for the effects of temperature-induced changes of the volume of the fluid comprising a diaphragm constituting at least at times another wall portion of the fluid cavity and movable in a direction to enlarge the effective volume of the cavity in response to a temperature-induced increase in the volume of the fluid and in a direction to reduce the effective volume of the cavity in response to a temperature-induced decrease in the volume of the fluid, and means for disabling said compensating means to change the effective volume of the cavity whenever said transducer is converting changes of fluid pressure into force or vice versa comprising a first member fixed to a first portion of said diaphragm, restraining means for exerting a force impeding movement of said first member and of said first portion of said diaphragm in response to changes in the pressure of the fluid, a second portion of said diaphragm being movable in response to changes in the pressure of the fluid, a second member movable relative to said first member in response to movement of said second portion of said diaphragm relative to said first portion of said diaphragm, and means responsive to said movement of said second member relative to said first member to lock both of said first and second members against movement relative to the body portion.

24. In a transducer for at times converting changes of fluid pressure into force or vice versa and including a body portion and a flexible member constituting wall portions of a fluid cavity, the combination of compensating means for compensating for the effects of temperature-induced changes of the volume of the fluid comprising a diaphragm constituting at least at times another wall portion of the fluid cavity and movable in a direction to enlarge the effective volume of the cavity in response to a temperature-induced increase in the volume of the fluid and in a direction to reduce the effective volume of the cavity in response to a temperature-induced decrease in the volume of the fluid, and means for disabling said compensating means to change the effective volume of the cavity whenever said transducer is converting changes of fluid pressure into force or vice versa comprising a first member fixed to a first portion of said diaphragm, restraining means for exerting a force impeding movement of said first member and of said first portion of said diaphragm in response to changes in the pressure of the fluid, a second portion of said diaphragm being movable in response to changes in the pressure of the fluid, a second member movable relative to said first member in response to movement of said second portion of said diaphragm relative to said first portion of said diaphragm, and means responsive to said movement of said second member relative to said first member to lock both of said first and second members against movement relative to the body portion comprising a third member fixed with respect to the body portion, a plurality of locking balls caged by one of said first and third members and engageable with a first surface of the other and engageable with a second surface of said second member, said first and second surfaces being inclined with respect to one another with reference to the direction of movement of said second member relative to said first member.

25. The combination of claim 24 further including spring means biasing said second member to move relative to said first member in the direction in which said diaphragm moves in response to a reduction of the effective pressure within the cavity.

26. In a transducer for at times converting changes of fluid pressure into force or vice versa and including a body portion and a flexible member constituting wall portions of a fluid cavity, the combination of compensating means for compensating for the effects of expansion and contraction of the fluid in response to changes of the temperature thereof comprising a diaphragm constituting at least at times another wall portion of the fluid cavity, temperature responsive means including a polymetallic element in heat transfer relation with the fluid for changing the position of said diaphragm to change the effective volume of the cavity in accordance with the temperature of said temperature responsive means, and means for disabling said compensating means to change the effective volume of the cavity whenever said transducer is converting changes of fluid pressure into force or vice versa comprising a first member fixed to a first portion of said diaphragm, restraining means including said polymetallic element for exerting a force impeding movement of said first member and of said first portion of said diaphragm in response to changes in the pressure of the fluid, a second portion of said diaphragm being movable in response to changes in the pressure of the fluid, a second member movable relative to said first member in response to movement of said second portion of said diaphragm relative to said first portion of said diaphragm, and means responsive to said movement of said second member relative to said first member to lock both of said first and second members against movement relative to the body portion.

27. In a transducer for at times converting changes of fluid pressure into force or vice versa and including a body portion and a flexible member constituting wall portions of a fluid cavity, the combination of compensating means for compensating for the effects of expansion and contraction of the fluid in response to changes of the temperature thereof comprising a diaphragm constituting at least at times another wall portion of the fluid cavity, temperature responsive means including a polymetallic element in heat transfer relation with the fluid for changing the position of said diaphragm to change the effective volume of the cavity in accordance with the temperature of said temperature responsive means, and means for disabling said compensating means to change the effective volume of the cavity whenever said transducer is converting changes of fluid pressure into force or vice versa comprising a first member fixed to a first portion of said diaphragm, restraining means including said polymetallic element for exerting a force impeding movement of said first member and of said first portion of said diaphragm in response to changes in the pressure of the fluid, a second portion of said diaphragm being movable in response to changes in the pressure of the fluid, a second member movable relative to said first member in response to movement of said second portion of said diaphragm relative to said first portion of said diaphragm, and means responsive to said movement of said second member relative to said first member to lock both of said first and second members against movement relative to the body portion comprising a third member fixed with respect to the body portion, a plurality of locking balls caged by one of said first and third members and engageable with a first surface of the other and engageable with a second surface of said second member, said first and second surfaces being inclined with respect to one another with reference to the direction of movement of said second member relative to said first member.

28. The combination of claim 27 further including spring means biasing said second member to move relative to said first member in the direction in which said diaphragm moves in a response to a reduction of the effective pressure within the cavity, the force exerted by said spring means being small relative to the force exerted by said polymetallic element.

29. In a force transmitting system for association with an actuating device movable in response to an applied force and a responding device movable in response to a force applied thereto and continuously exerting an opposing force, the combination of a first movable element coupled to the actuating device, a second movable element coupled to the responding device, means effective during at least a portion of the movement of either said movable elements for applying a force to one of said movable elements which varies with and has a preselected relation to the force applied to the other one of said elements, and means effective in response to and only while both of said movable elements are effectively stationary for applying a force to one of said movable elements which varies with and has a different preselected relation to the force applied to the other one of said movable elements.

30. In a force transmitting system for association with an actuating device movable in response to an applied force and a responding device movable in response to a force applied thereto and continuously exerting an opposing force, the combination of a first movable element coupled to the actuating device, a second movable element coupled to the responding device, means effective during at least a portion of the movement of either said movable elements for applying a force to one of said movable elements, which varies with and has a preselected relation to the force applied to the other one of said elements, and means effective in response to and only while both of said movable elements are effectively stationary and only in a selected portion of the range of the positions of said movable elements for applying a force to one of said movable elements which varies with and has a different preselected relation to the force applied to the other one of said movable elements.

31. In a force transmitting system for association with an actuating device movable in response to an applied force and a responding device movable in response to a force applied thereto and continuously exerting an opposing force, the combination of a first movable element coupled to the actuating device, a second movable element coupled to the responding device, means including said second movable element and effective during at least a portion of the movement of said first movable element for applying to said first movable element a force of a magnitude having a preselected relation to the magnitude of the opposing force and effective only in a selected portion of the range of positions of said first movable element for applying a force to said first movable element of a magnitude having a different preselected relation to the magnitude of the opposing force.

32. In a force transmitting system for association with an actuating device movable in response to an applied force and a responding device movable in response to a force applied thereto and continuously exerting an opposing force, the combination of a first movable element coupled to the actuating device, a second movable element coupled to the responding device, means including said second movable element and effective during at least a portion of the movement of said first movable element for applying to said first movable element a force of a magnitude having preselected relation to the magnitude of the opposing force and effective only in a selected portion of the range of positions of said first movable element and only while said first movable element is effectively stationary for applying a force to said first movable element of a magnitude having a different preselected relation to the magnitude of the opposing force.

33. In a sealed force-transmitting hydrostatic system for association with an actuating device movable in response to an applied force and a responding device movable in response to a force applied thereto and continuously exerting an opposing force, the combination of a liquid conduit, a responding transducer connected to said conduit and including movable piston means responsive to liquid pressure applied to the effective area thereof from said conduit to move the responding device against the opposing force exerted thereby, an actuating transducer connected to said conduit and including movable piston means responsive to a force applied to an effective area thereof by the actuating device to apply liquid pressure to said conduit, and means effective in response to termination of the movement of both of said piston means and effective only while said movable piston means are in a selected portion of their ranges of positions for effectively changing the effective area of one of said piston means.

34. In a sealed force-transmitting hydrostatic system for association with an actuating device movable in response to an applied force and a responding device movable in response to a force applied thereto and continuously exerting an opposing force, the combination of a liquid conduit, a responding transducer connected to said conduit and including movable piston means responsive to liquid pressure applied thereto from said conduit to apply a force to the responding device against the opposing force exerted thereby, and an actuating transducer connected to said conduit and comprising first movable piston means connectable to the actuating device and movable in response to movements thereof for applying fluid pressure to said conduit, second movable piston means drivingly engaging said first movable piston means only in a portion of the range of positions of said first movable piston means and effective in response to liquid pressure in said conduit resulting from the application of the opposing force by the responding device to said movable piston means of said responding transducer to apply an opposing force to said first movable piston means.

35. The combination of claim 34 in which said second piston means, while effective, prevents the liquid pressure in said conduit resulting from the application of the opposing force by the responding device to said movable piston means of said responding transducer from acting against the effective area of said first movable piston means.

36. The combination of claim 35 in which the effective area of said second movable piston means is substantially less than the effective area of said first movable piston means.

37. The combination of claim 36 in which said second movable piston means is effective only while said first movable piston means is stationary.

38. In a sealed force transmitting hydrostatic system for association with an actuating device and a responding device and including an actuating transducer for converting force applied thereto by the actuating device into liquid pressure and a responding transducer for converting liquid pressure applied thereto into force appliable to the responding device, the improvement in which each of said transducers comprises a hollow cylinder assembly having an interior wall surface and a cavity therewithin, a rolling lobe diaphragm having a peripheral lip fixed with respect to said cylinder assembly, and a piston secured to said diaphragm and movable longitudinally of said cylinder assembly and substantially coaxially therewith and connectable to one of the actuating and responding devices; said diaphragm having a surface engageable with the interior wall surface of said cylinder assembly and with said piston and transferring from one to the other during movement of said piston longitudinally of said cylinder assembly and having a rolling lobe between said interior wall surface of said cylinder assembly and said piston; a sealed liquid conduit sealed to and interjoining said cavities of said transducers, a liquid having a temperature coefficient of expansion filling said cavities and said conduit, the effective volumes of said cavities varying inversely with one another as said pistons move during operation of the system, each of said pistons being movable to a position within its associated cylinder assembly to cause the cavity to be generally tubular in form over a portion of its length, at least one of said tubular formed cavities existing at all conditions of operation of the system, said cylinder assembly of at least one of said transducers having a higher temperature coefficient of expansion than the piston thereof for increasing the percentage differential rate of volume change of the cavity with a change in temperature, an additional means for compensating for the effects of the change of the volume of the liquid produced by changes of the temperature thereof comprising a diaphragm constituting at least at times a wall portion of said cavity of at least one of said transducers and movable in a direction to enlarge the effective volume of the cavity in response to a temperature-induced increase in the volume of the fluid and in a direction to reduce the effective volume of the cavity in response to a temperature-induced decrease in the volume of the fluid, a hollow stem secured to and supported by said diaphragm for conveying fluid into the cavity during filling thereof, and means for sealing said stem to prevent egress of the fluid therethrough, said stem projecting from the body portion and indicating the effective volume of the fluid.

References Cited by the Examiner

UNITED STATES PATENTS

| | | | |
|---|---|---|---|
| 1,952,105 | 3/34 | Tseng | 252—73 |
| 1,995,659 | 3/35 | Trier | 60—54.6 XR |
| 2,072,693 | 3/37 | Volkert | 60—54.5 |
| 2,178,490 | 10/39 | Nielsen | 60—54.6 XR |
| 2,178,953 | 11/39 | Chilton | 137—793 |
| 2,185,277 | 1/40 | Stelzer | 60—54.5 |
| 2,198,965 | 4/40 | Habig et al. | 60—54.5 |
| 2,209,844 | 7/40 | Otto | 92—99 X |
| 2,230,335 | 2/41 | Smith | 60—54.5 X |
| 2,275,758 | 3/42 | Harris | 60—54.5 X |
| 2,286,661 | 6/42 | Warner | 60—54.6 |
| 2,376,892 | 5/45 | Avigdor | 137—779 |
| 2,397,876 | 4/46 | Martin et al. | 60—54.5 |
| 2,546,571 | 3/51 | Watson | 92—1 |
| 2,612,419 | 9/52 | Reynolds | 60—54.6 XR |
| 2,616,854 | 11/52 | Fenske | 252—79 |
| 2,673,038 | 3/54 | Vernet et al. | 60—54.5 X |
| 2,733,572 | 2/56 | Butterfield et al. | 60—54.5 |
| 2,829,500 | 4/58 | Butler | 60—54.6 |
| 2,906,095 | 9/59 | Whitehead | 60—54.5 |
| 3,040,712 | 6/62 | Harrah | 92—248 X |

JULIUS E. WEST, *Primary Examiner.*

SAMUEL LEVINE, ROBERT R. BUNEVICH,
*Examiners.*